INVENTOR:
DONALD D. MODGLIN
BY
Harrington A. Lackey
ATTORNEY

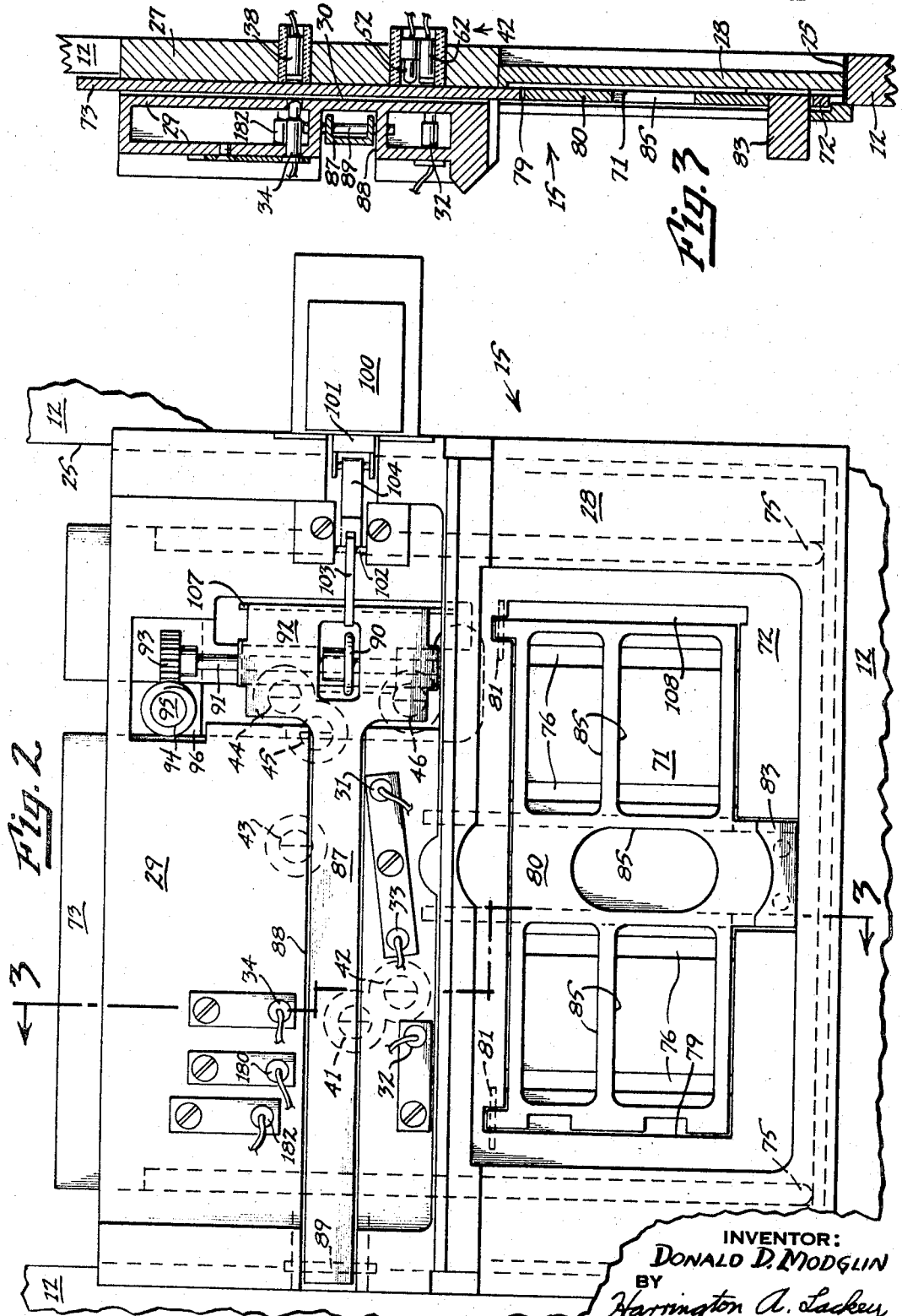

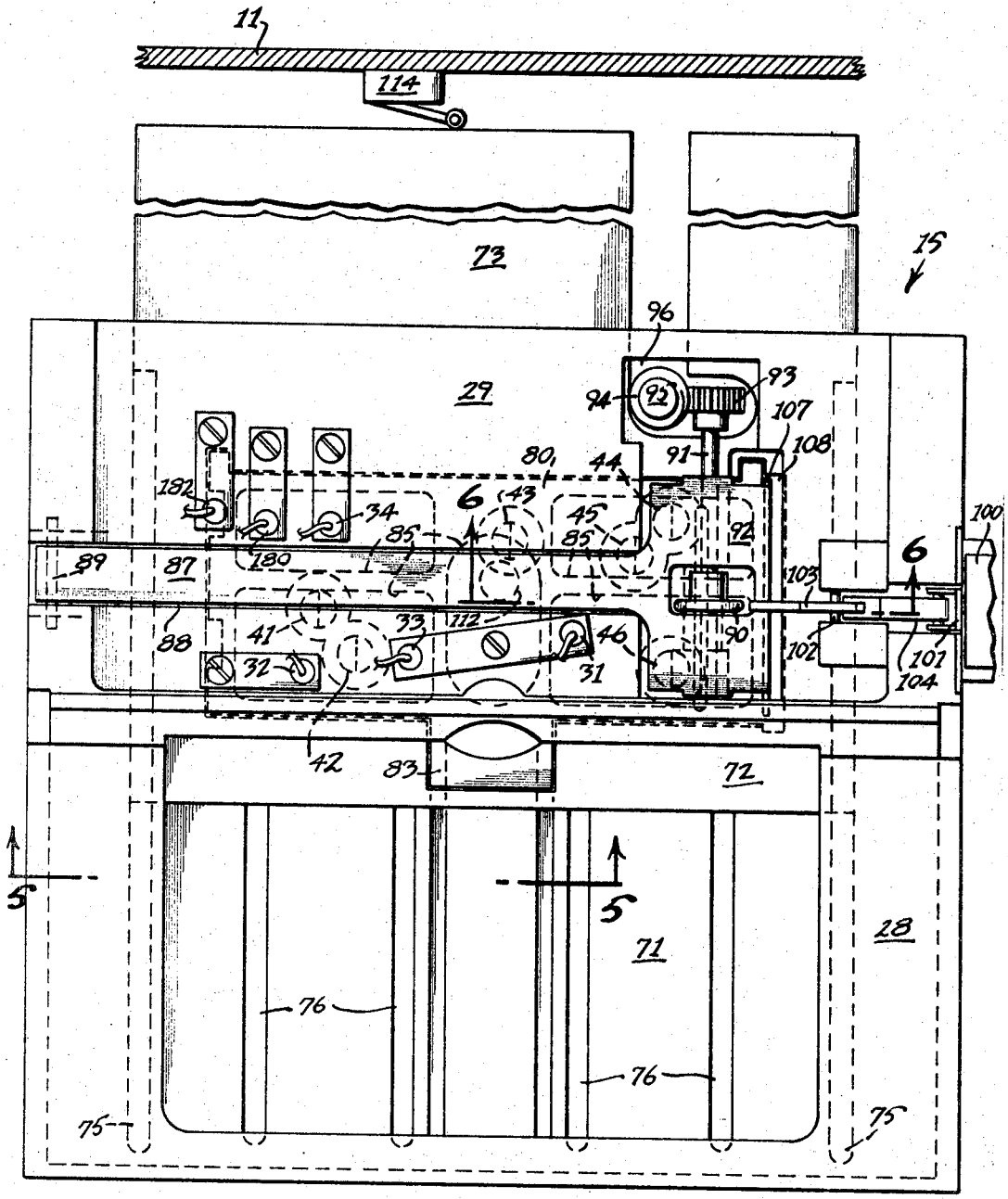
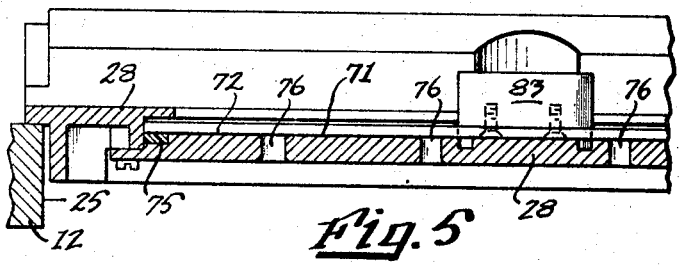
Fig. 4
Fig. 5
INVENTOR:
DONALD D. MODGLIN
BY
Harrington A. Lackey
ATTORNEY

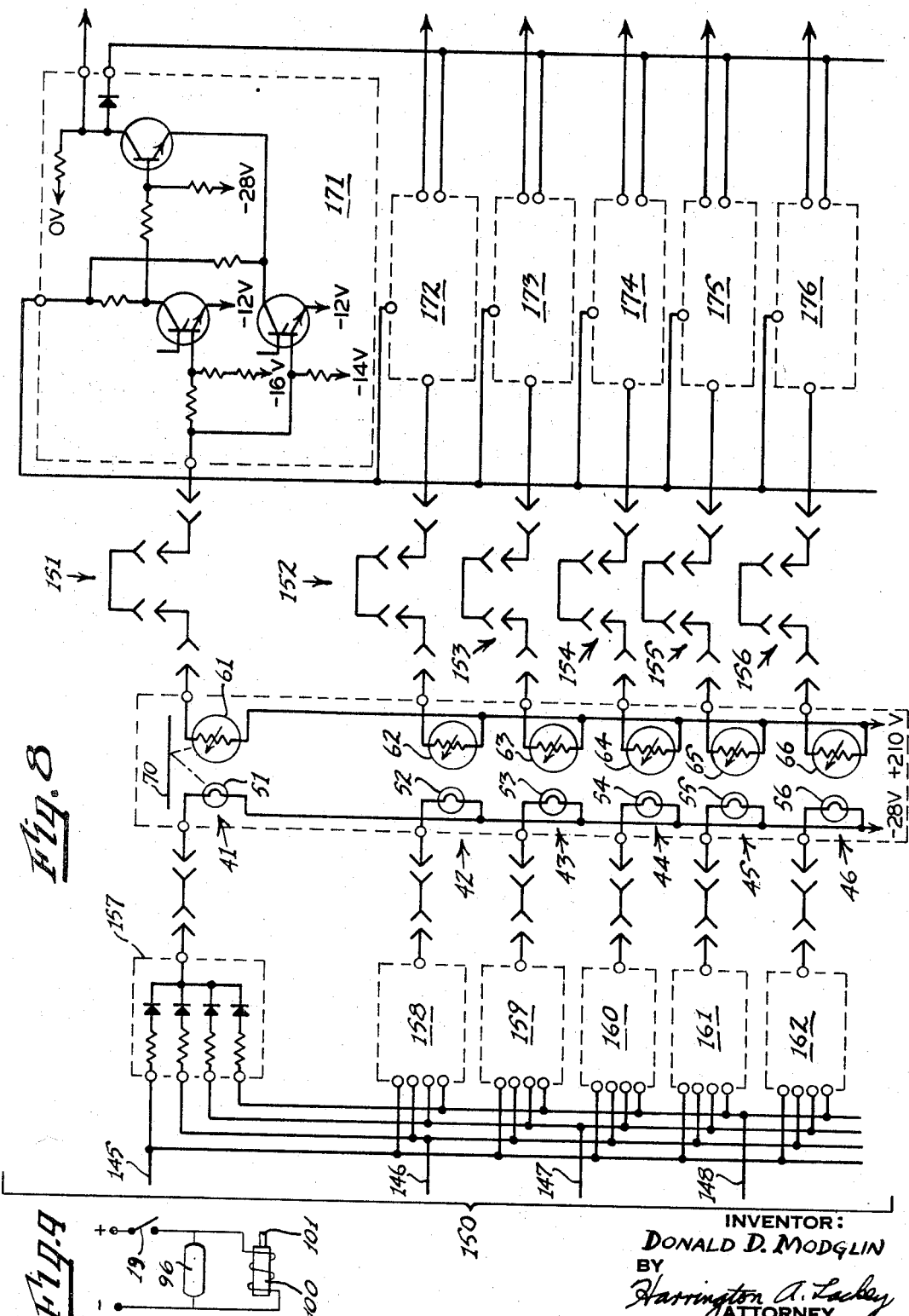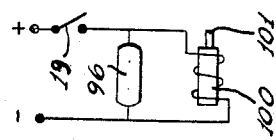

United States Patent Office 3,443,107
Patented May 6, 1969

3,443,107
RADIATION SENSITIVE CURRENCY TESTING DEVICE
Donald D. Modglin, Nashville, Tenn., assignor to Automated Machines Corporation, Nashville, Tenn., a corporation of Tennessee
Filed May 28, 1965, Ser. No. 459,850
Int. Cl. G01n 21/30
U.S. Cl. 250—219                     5 Claims

ABSTRACT OF THE DISCLOSURE

The denomination and genuineness of paper currency is determined by means of apparatus using light sources and photoelectric cells on opposite sides of the currency. After the currency is read and verified the operator has the choice of recovering it or leaving it in the apparatus which then performs its designed function.

---

This invention relates to a currency testing device, and more particularly to a device which identifies both the denomination and genuineness of paper currency.

Within the recent years, the art of identifying and testing paper currency has been developed in a variety of forms, primarily in order to meet the demands of the growing vending machine business, which had been limited to the vending of lower-priced articles, because the machines could only handle coins. Although there are several different methods of identifying the denomination and genuineness of paper currency, the general method is by reading or scanning various parts of the bill with a light source or sources on one side of the bill and light responsive or photoelectrical cells located on the opposite side of the bill for receiving the light transmitted through the currency and converting the light to a proportional electrical signal. These various signals are compared electrically or electronically with the correct light signals for a genuine bill, resulting in the currency either being accepted or rejected.

It is therefore an object of this invention to provide a currency testing device which includes an improved reading circuit for more accurately determining the denomination and genuineness of paper currency with a minimum of error.

Another object of this invention is to provide a currency testing device which permits the operator of the device at his option, to recover his currency after the reading circuit is energized, and even if the currency is accepted by the device as genuine.

A further object of this invention is to provide a currency testing device adapted to be incorporated in a depositary machine, a vending machine or the like, comprising means not only for identifying the currency in a testing area, but also discharging the accepted currency from the testing area.

Another object of this invention is to provide a currency testing device incorporated in a depositary machine having independently operated switch means for the testing of the currency and for the depositing of the currency.

Another object of this invention is to provide in a currency testing device, a separately controlled mechanism for feeding the currency after it is tested and accepted, away from the testing area, without interfering with the testing of the currency.

A further object of this invention is to provide in a currency testing device, a reading circuit incorporating one set of light transmission units including light sources on one side of the currency and opposing photoelectric cells on the opposite side of the currency, and a second set of light reflective units including light sources and photoelectric cells on the same side of the currency.

Further objects and advantages of the invention will be apparent from the following description taken in conjunction with the drawings, wherein:

FIG. 2 is a fragmentary top plan view of the currency testing device disclosing the currency drawer frame in inoperative position;

FIG. 3 is a section taken along the line 3—3 of FIG. 2;

FIG. 4 is an enlarged view of FIG. 2 with the currency drawer frame disclosed in operative position;

FIG. 5 is a section taken along the line 5—5 of FIG. 4;

FIG. 8 is a schematic circuit diagram showing the second stage of the electronic circuit; and FIG. 9 is a schematic circuit diagram of the second switch means for feeding the currency away from the testing area.

Figure 1:
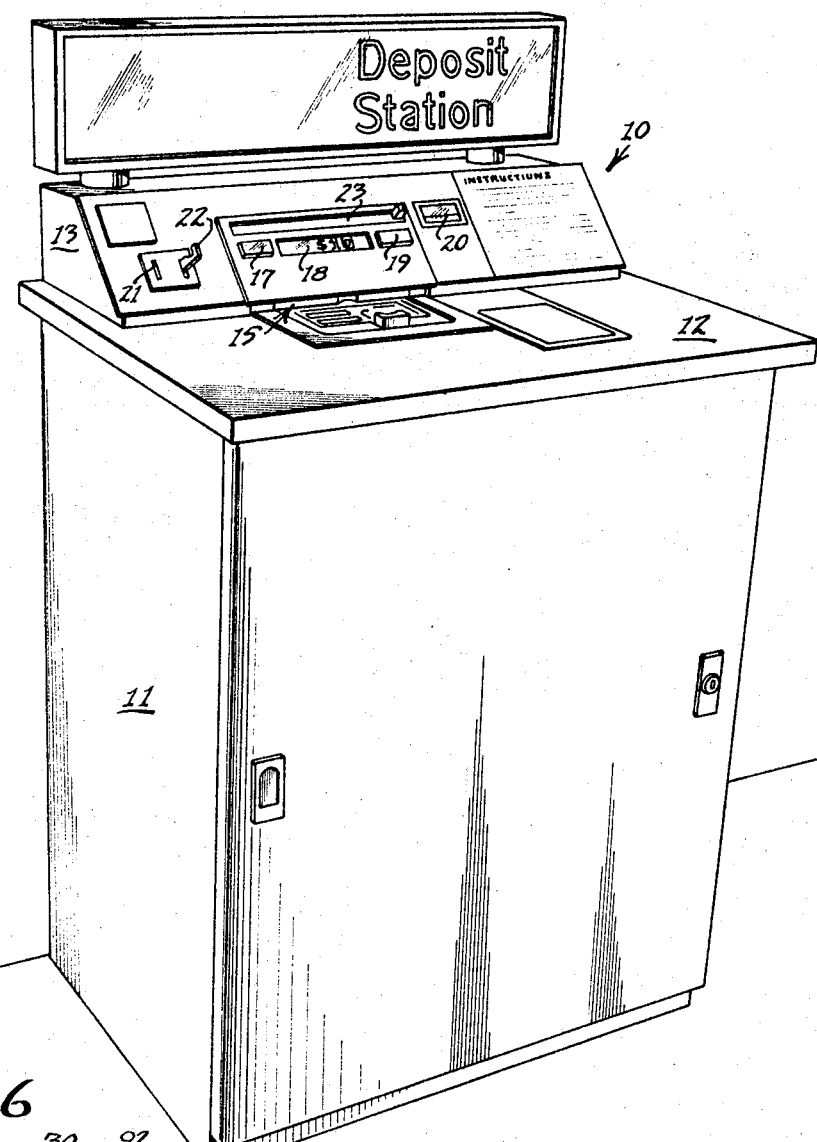
FIG. 1 is a perspective view of a depositary machine in which the currency testing device made in accordance with this invention is incorporated.

Referring now to the drawings in more detail, FIG. 1 discloses a depositary machine 10, including a cabinet or housing 11, a table top 12 and an upper or control housing 13. Mounted in the table top 12 and a portion of the control housing 13 is the currency testing device 15. Mounted above the testing device 15 in the control housing 13 are a reject light 17, a denomination indicating window 18, and the deposit switch button 19. Also mounted on the control housing 13 is a totalizing window 20 to indicate the total amount deposited, and such optional features as a coin deposit slot 21, a coin reject lever and a check deposit door 23. These optional features 21, 22 and 23 form no part of this invention.

Referring now to FIGS. 2–6 the testing device 15 is of generally rectangular shape and is adapted to be fitted in a corresponding opening 25 in the table top 12. The testing device 15 includes a bottom or lower reading plate 27 and a drawer supporting plate 28 extending forwardly of the reading plate 27. Spaced slightly above the bottom reading plate 27 is a top or upper reading plate 29 which is substantially coextensive and parallel with the bottom reading plate 27 to form the testing area 30.

Mounted in the top reading plate 29 are four light transmission sources such as the lamps 31, 32, 33 and 34, disclosed in FIGS. 2, 3, 4 and 7. Located directly opposite each of these lamps 31–34 in the bottom reading plate 27 are the corresponding light responsive elements or photocells 35, 36, 37 and 38, as disclosed in FIGS. 3 and 7. Each of these lamps 31–34 and their corresponding photocells 35–38 will be hereinafter referred to as light transmission units. As indicated in the drawings, the light transmission units 31–38 are so positioned in the reading plates 29 and 27, that each unit will transmit light through localized areas of the bill 70 when the bill 70 is in the testing area 30. The light transmission units 31–38 are so arranged that each unit will read a localized area of different opacity in each bill 70.

In addition to the light transmission units, a plurality of light reflective units 41, 42, 43, 44, 45 and 46 are mounted in the bottom reading plate 27, as best disclosed in FIGS. 2, 3 and 4. As disclosed in FIG. 8, each light reflective unit 41–46 includes a light source, or lamp 51, 52, 53, 54, 55 and 56, respectively, and a light responsive element or photoelectric cell 61, 62, 63, 64, 65 and 66, respectively. The units 41–46 are so arranged that light from each lamp 51–56 is reflected from a spot or localized area of different reflectivity on the back or bottom of a bill 70 to the corresponding photocell 61–66.

In order to introduce paper currency such as bills 70 into the testing area 30, a recess 71 is formed in the drawer supporting plate 28. The bottom surface of the recess 71 is coplanar with the top surface of the bottom reading plate 27. Adapted to slide within the recess 71 and across the bottom reading plate 27 is a drawer frame 72, having a leading guide plate 73 extending into the control housing 13 to assist in guiding the drawer frame 72 into and out of the testing area 30. In order to facilitate the sliding movement of the drawer frame 72 over the recess 71, tracks, such as the Teflon runners 75, may be formed in the recess 71 as best disclosed in FIG. 5. Elongated openings 76 may be provided in the drawer supporting plate 28 to facilitate the discharge of dirt in order to keep the recess 71 clean and also to facilitate slidable movement of the drawer frame 72 and to reduce the friction between the currency bill 70 and the recess 71.

The drawer frame 72 is provided with a rectangular opening 79, preferably slightly larger than the size of a currency bill 70, and a rectangular cover or door 80 pivotally mounted in the drawer frame 72 by means of hinges 81 to fit within the opening 79 when closed. When the drawer frame 72 is in its withdrawn inoperative position disclosed in FIG. 2, cover 80 may be raised about its hinges 81 and the bill 70 placed within the drawer frame opening 79 to rest on the recess 71. The cover is then closed on top of the bill 70 and by means of the handle 83, the entire drawer frame 72, cover 80 and bill 70 may be thrust into the control housing 13 until the bill 70 is located in its proper reading position in the testing area 30. Appropriate stops may be provided to limit the rearward movement of the drawer frame 72 so that the bill 70 is in proper alignment with the light units 31—38 and 41—46.

It will be noted that the handle 83 serves a dual function. Since the handle 83 is fixed to the cover 80, it may be employed to raise and lower the cover 80, and when in closed position, the handle 83 may be employed to thrust the entire drawer frame 72 within the control housing 13.

The cover 80 is also provided with a plurality of large openings 85 so that when the bill 70 has been positioned within the testing area 30, the only obstruction between the lamps 31–34 and their corresponding photocells 35–38 will be the bill 70 itself. The relative locations of these openings 85 and the light transmission units 31–38 are best disclosed in FIG. 4, where the drawer frame 72 is fully inserted into its operative position.

In order to discharge the bill 70 from the testing area 30 and feed it to another position or area, such as a deposit receptacle, not shown, in the depositary machine 10, a feeding apparatus is employed in association with the reading plates 27 and 29. As best disclosed in FIGS. 2 and 4, this feeding apparatus includes an elongated T-shaped wheel supporting frame 87 carried in a recess 88 in the top reading plate 29. One end of the frame 87 is pivoted by a hinge 89 adjacent one end of the top reading plate 29, so that the frame 87 may swing toward and away from the testing area 30. A wheel 90 is fixed on a drive shaft 91 which is journaled for free rotation in the enlarged head portion 92 of the frame 87. A gear 93 on the rear end of the drive shaft 91 meshes with a worm gear 94 formed on the upper end of a motor shaft 95 driven by the electric motor 96, located below the bottom reading plate 27. In this manner, the wheel 90 is driven in the direction of the arrow disclosed in FIG. 6 so that when it is in the depressed solid-line position of FIG. 6, it will engage the top of the bill 70 to feed the bill away from the testing area 30.

In order to depress the wheel 90, a solenoid 100 is mounted in the control housing 13 with its armature 101 directed toward the T frame 87. Pivotally mounted on the upper reading plate 29 by the hinge pin 102 is a bell crank 103. One arm of the bell crank 103 is pivotally connected by link 104 to the armature 101, while the other or lever arm of bell crank 103 extends across and in engagement with the top of the head portion 92 of the T-frame 87.

Figure 6:
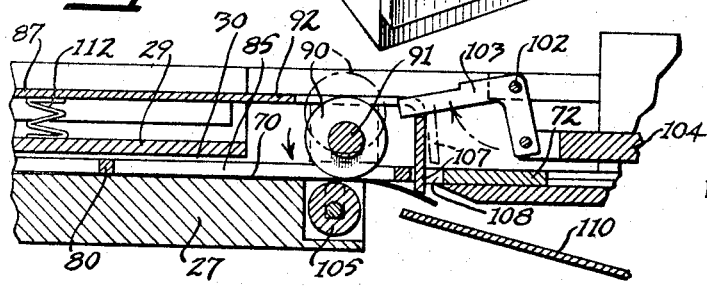
FIG. 6 is a section taken along the line 6—6 of FIG. 4.

Thus, as disclosed in FIG. 6, when the solenoid 100 is energized to withdraw the armature 101, the bell crank 103 pivots about the hinge pin 102 to depress the T-frame 87, so that the wheel 90 assumes the solid-line position of FIG. 6 to engage the top of the bill 70 and bear against the roller or bearing 105 journaled in the bottom reading plate 27. It will also be noted that the end of the head portion 92 is provided with a down-turned flange or deflector blade 107. When the T-frame 87 is depressed, the deflector blade 107 will descend through a mating opening 108 formed between the cover 80 and the drawer frame 72 to deflect the bill 70 downwardly. When the wheel 90 is driven to discharge the bill 70, the bill will also be directed by the deflector blade 107 toward a discharge station, such as a chute 110, where it will be conveyed or transferred to another station or depositary receptacle, not shown, for further disposition, if desired.

When the solenoid 100 is deenergized, a spring 112 is mounted in the recess 88 to urge the T-frame 87 upwardly so that the wheel 90 will assume the phantom position of FIG. 6, completely removed from the testing area 30. The upwardly biased movement of the T-frame 87 will also counterrotate the bell crank 103 to project the armature 101 from the solenoid 100. It will also be understood that most solenoids, such as solenoid 100, are already provided with springs for returning their armatures to inoperative position when the solenoids are deenergized.

Figure 7:
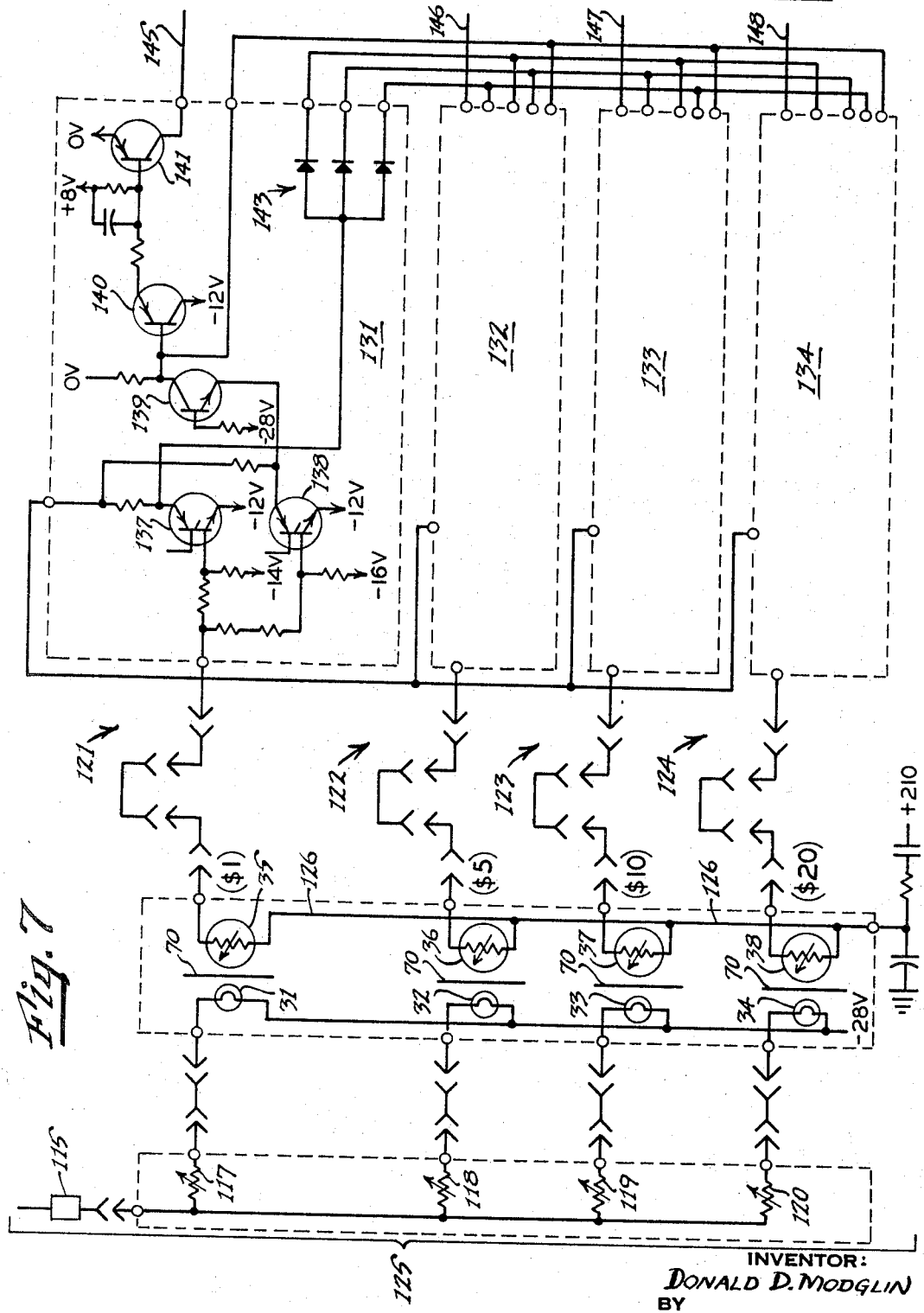
FIG. 7 is a schematic circuit diagram showing the first stage of the electronic circuit.

The electronic circuitry for operating the light transmission units 31—38 and the light reflective units 41—46 are disclosed in FIGS. 7 and 8. After the drawer frame 72 is thrust into the control housing 13 and is positioned within the testing area 30, the back of the guide plate 73 will engage and close the microswitch 114 (FIG. 4) mounted on some stationary part of the cabinet 11, such as the back wall. Microswitch 114 in turn energizes relay 115 (FIG. 7), which in turn energizes the light sources or lamps 31, 32, 33 and 34 through their respective potentiometers 117, 118, 119 and 120 in the corresponding identification or identification circuits 121, 122, 123 and 124. The identification circuits 121–124 comprise the first-stage 125, disclosed in FIG. 7, of the electronic reading circuit. With the bill 70 in reading position, the localized areas of varying opacities filter the light rays from the lamps 31–34. The filtered light rays then affect the corresponding resistances of the photocells 35–38, which are energized by a ramp voltage from the voltage supply line 126. The resulting signals from the photocells 35–38 are transmitted through the corresponding identification circuits 121–124 to the corresponding detector circuits 131, 132, 133 and 134. Since these detector circuits are identical in construction, only the details of the detector circuit 131 have been disclosed in FIG. 7, and will be described.

The detector circuit 131 comprises a pair of silicon control switches 137 and 138, the signals from which are amplified through the transistors 139, 140, and 141. The detector circuit 131 sets up a current threshold, which, when attained by the ramp voltage, causes the detector circuit 131 to operate. When the first detector circuit 131–134 reaches its threshold value and turns on, the three remaining detector circuits are cut off through the gating circuit 143.

The output signal from the first-stage 125, which is the output signal from the single turned-on detector circuit 131, 132, 133 or 134, is communicated through the lines 145, 146, 147 or 148 to the second-stage 150 of the reading circuit, including six verifying circuits 151, 152, 153, 155 and 156. Each verifying circuit contains a bank of potentiometers 157, 158, 159, 160, 161 and 162. Each bank, such as 157, includes four poentiometers, each potentiometer in a bank receiving a signal from each corresponding output line 145, 146, 147 or 148. The signal received from the first stage 125 thus energizes all six lamps 51-56 in the verifying circuits 151-156, the light from which is reflected off the bottom surface of the bill 70 to the corresponding photocells 61-66. The resulting signals produced in the photocells 61-66 are transmitted through the verifying circuit 151-156 to corresponding detector circuits 171, 172, 173, 174, 175 and 176. These detector circuits are quite similar to the detector circuits 131-134, exeept that the gating circuit is omitted and the detector circuits 171-176 establish both a high and a low threshold value between which the signal from each corresponding photocell 61-66 must correspond in order for each detector circuit 171-176 to have an output signal.

Therefore, if the bill 70 passes both the light transmission test of the first-stage circuit 125, and the light reflective test of the second-stage circuit 150, the output signal from one or more of the detector circuit 171-176 will energize appropriate mechanism, not shown, to register the correct denomination of a valid bill through the window 18 in FIG. 1. If the bill 70 does not pass all of the tests of the circuits 125 and 150, then the reject light 17 will illuminate in the control housing 13 of FIG 1.

In addition to the above lights and circuits, a transmission light 180 (FIGS. 2 and 4) may be mounted in the upper reading plate 29 together with a corresponding photocell, not shown, in the lower reading plate 27 in order to detect the mere presence or absence of a bill 70 in the drawer frame 72 when the drawer frame is moved to its operative position disclosed in FIG. 4.

Another transmission-type light 182 may also be mounted in the upper reading plate 29 and a corresponding photocell, not shown, in the lower reading plate 27, and connected in a circuit, not shown, associated with the first-stage circuit 125, to provide an automatic gain control (AGC) for the lamps 31-34 to accommodate currency bills 70 of different cleanliness.

The operation of this invention is as follows:

Assuming that the currency testing device 15 is employed in a depositary machine 10, such as illustrated in FIG. 1, and assuming that the drawer frame 72 is initially within its withdrawn, inoperative position, disclosed in FIGS. 1 and 2, the operator grasps the handle 83 and raises the cover 80 about the hinges 81 and places the bill 70 within the frame opening 79. Assuming that the bill 70 is a one-dollar bill, the cover 80 is closed upon the bill and the drawer frame 72 thrust into the control housing 13 until the drawer frame 72 is in its extreme rearward and reading position within the testing area 30.

At this point, the microswitch 114 is closed to energize relay 115 and illuminate the transmission lamps 31-34. However, because of the location of the lamps 31-34 in the upper reading plate 29, only the lamp 31 will transmit sufficient light through its corresponding localized area of the one-dollar bill 70 to energize the photocell 35 sufficiently to transmit a signal above the threshold value of the detector circuit 131. Even if one of the other photocells 36, 37 or 38 should be energized to transmit a signal great enough to exceed the threshold value of its corresponding detector circuit 132, 133 or 134, the first-stage circuit 125 and the location of the lights 31-34 are so designed that the signals from photocell 35 will energize the detector circuit 141 first, energizing the gating circuit 143, which automatically turns off the remaining detector circuits 132, 133 and 134. The resulting amplified signal from the output line 145 of the first-stage 125 is transmitted to every one of the verifying circuits 151-156, but only through its corresponding potentiometer in each bank 157-162. Thus, all the reflective lamps 151-156 are illuminated and reflected off localized areas of various reflective values on the back of the bill 70. The corresponding signals generated in the photocells 61-66 will not only reach a value between the high and low threshold values of the appropriate detector circuits 171-176 to verify the denomination, but will also verify the genuineness of the one-dollar bill. The resultant output signals from the second-stage 150 will activate appropriate mechanism to indicate "$1.00" in the window 18.

At this time, even though the one-dollar bill has been read and verified by the depositary machine 10, the operator or depositor still has the choice of recovering his one-dollar bill by grasping the handle 83 and removing the drawer frame 72 from the control housing 13. However, if the operator wishes to deposit the one-dollar bill after it has been read and verified, he depresses the switch button 19 on the control housing 13 in FIG. 1, which closes the parallel circuit disclosed in FIG. 9 to simultaneously energize the electrical motor 96 and the solenoid 100. Energization of the solenoid 100 depresses the head portion 92 until the wheel 90 engages the top of the bill 70. Energization of the electric motor 96 drives the wheel 90 in a counterclockwise direction, as viewed in FIG. 6, to drive the one-dollar bill 70 between the wheel 90 and the roller bearing 105 toward the right, as viewed in FIG. 6. The deflector blade 107 deflects the moving bill 70 downward to discharge the bill from the testing area 30 and upon the chute 110. The bill 70 is then deposited in a suitable receptacle or conveyed to another station depending upon the function of the particular depositary machine 10.

It will be understood that the testing device 15 may be employed with a vending machine for reading, verifying and depositing paper currency of various denominations, totalizing the currency and actuating the appropriate mechanism for discharging the vended product.

It will be apparent to those skilled in the art that various changes may be made in the invention without departing from the spirit and scope thereof and therefore the invention is not limited by that which is shown in the drawings and described in the specification, but only as indicated in the appended claims.

What is claimed is:

1. A detecting device for paper currency or the like comprising:
   (a) a housing,
   (b) a testing area in said housing for receiving said currency,
   (c) a plurality of light sensitive units in said testing area arranged to read localized areas on said currency in said testing area,
   (d) first switch means for energizing said light sensitive units,
   (e) signal means actuated by said light sensitive units to indicate the genuineness of said currency,
   (f) a wheel supporting frame mounted in said housing for movement toward and away from said testing area,
   (g) a wheel rotatably mounted in said frame,
   (h) electrical means for moving said frame to cause said wheel to engage currency in said testing area,
   (i) electrical motive means operatively connected to said wheel to drive said wheel,
   (j) second switch means for energizing said electrical means and said electrical motive means simultaneously so that said wheel is driven while engaging said currency in said testing area to move said currency away from said testing area, and
   (k) manual means for actuating said second switch means independently of said first switch means.

2. The invention according to claim 1 in which said electrical means comprises solenoid means.

3. The invention according to claim 1 in which said frame is elongated, means pivotally mounting said frame in said housing for swinging movement of said wheel toward and away from said testing area.

4. The invention according to claim 3 in which said electrical means comprises a solenoid mounted in said housing, a bell crank pivotally mounted in said housing adjacent said frame, one arm of said bell crank being connected to the armature of said solenoid, and the other arm of said bell crank being connected to said frame to urge said wheel toward said testing area when said solenoid is energized.

5. The invention according to claim 3 further comprising a deflector blade on said frame adjacent said wheel and projecting toward said testing area to engage and deflect currency moved by said wheel from said testing area.

References Cited
UNITED STATES PATENTS

| | | | |
|---|---|---|---|
| 2,951,164 | 8/1960 | Timms | 250—219 |
| 3,108,693 | 10/1963 | Patzer | 194—4 X |
| 3,114,444 | 12/1963 | Patzer | 88—14 X |
| 3,109,100 | 10/1963 | Gecewicz | 250—219 |

WALTER STOLWEIN, *Primary Examiner.*

U.S. Cl. X.R.

88—14; 194—4